Sept. 2, 1958 W. MÜLLER 2,850,570
SOUND RECORDING AND REPRODUCING APPARATUS IN
CONJUNCTION WITH A TELEPHONE SUBSCRIBER SET
Filed July 28, 1953 5 Sheets-Sheet 1

INVENTOR
Willy Müller
BY
Curtis, Morris + Safford
ATTORNEYS

Sept. 2, 1958 W. MÜLLER 2,850,570

SOUND RECORDING AND REPRODUCING APPARATUS IN CONJUNCTION WITH A TELEPHONE SUBSCRIBER SET

Filed July 28, 1953 5 Sheets-Sheet 2

INVENTOR
Willy Müller
BY
Curtis, Morris & Safford
ATTORNEYS

INVENTOR
Willy Müller
BY
Curtis, Morris & Safford
ATTORNEYS

Sept. 2, 1958 W. MÜLLER 2,850,570

SOUND RECORDING AND REPRODUCING APPARATUS IN CONJUNCTION WITH A TELEPHONE SUBSCRIBER SET

Filed July 28, 1953 5 Sheets-Sheet 4

INVENTOR
Willy Müller
BY
Curtis, Morris + Safford
ATTORNEYS

INVENTOR
Willy Müller
BY
Curtis, Morris & Safford
ATTORNEYS

United States Patent Office 2,850,570

Patented Sept. 2, 1958

2,850,570

SOUND RECORDING AND REPRODUCING APPARATUS IN CONJUNCTION WITH A TELEPHONE SUBSCRIBER SET

Willy Müller, Zurich, Switzerland, assignor to Internova Trust, Vaduz, Liechtenstein Application July 28, 1953, Serial No. 370,818

Claims priority, application Switzerland July 31, 1952

17 Claims. (Cl. 179—6)

The present invention relates to a sound recording and reproducing apparatus in conjunction with a telephone subscriber set, in which apparatus a drive motor, an audio-frequency amplifier, a magnetically acting sound recording and reproducing head, an erasing magnet, a sound carrier disk capable of being driven by the motor, and manually operatable and automatically operated switching members cooperate in such a way that at will, either any message can be recorded on the sound carrier disk or such message can be played over to a subscriber calling, via the telephone network, the telephone set equipped with the apparatus.

According to the invention, the sound carrier disk, which is driven by the motor through a friction gear, is positively connected through a reducing planetary gear to a disk cam, coaxial with said sound carrier disk, against the peripheral surface designed as a cam track of which disk cam an arm of a sound head carrier bears under the action of a spring, whilst one lateral face of said disk cam is provided with concentric guiding or control grooves by means of each of which a set of electrical contacts is operated in positive dependence on the relative position of the sound head to the sound carrier disk.

In the accompanying drawings an embodiment of an instrument in accordance with the invention is depicted.

Figure 1:
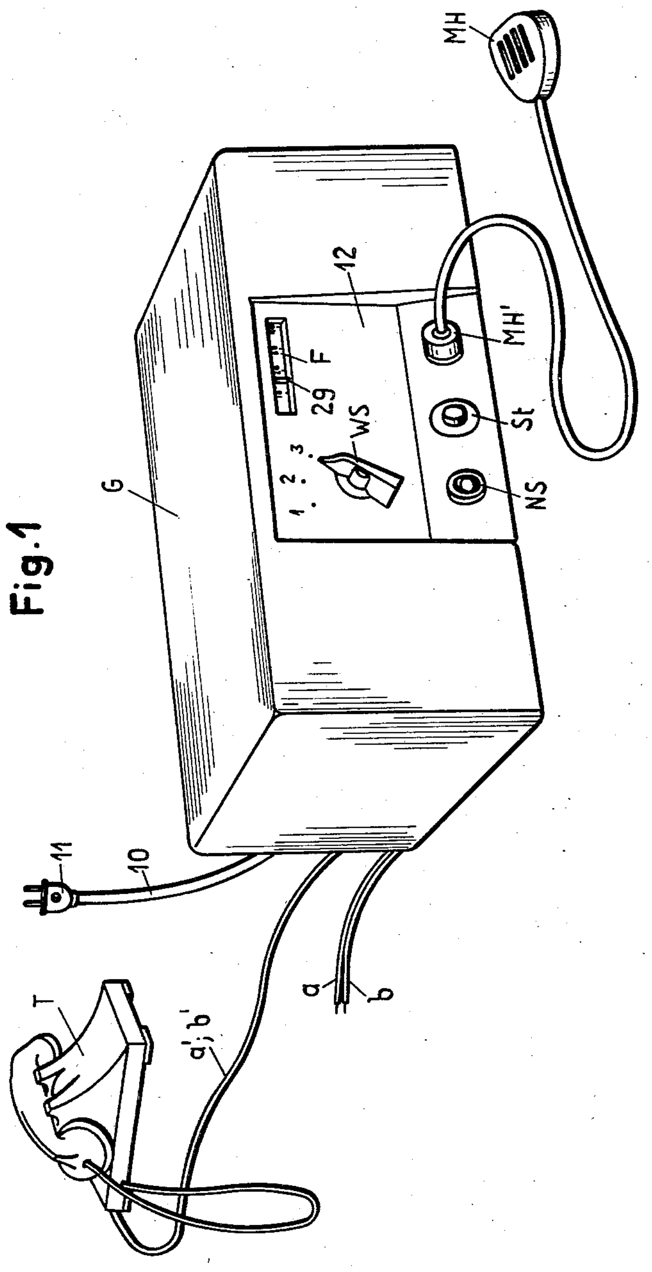
Figure 1 is a general view of the apparatus connected to the subscriber set, and of the most important connecting leads.

Referring now to Figure 1 of the drawing, the inventive apparatus as a complete unit is designated by the reference letter G, and its mains connecting cord 10 ends in a plug 11. The subscriber line with its wires *a* and *b* is connected to the apparatus G, whilst the telephone subscriber set T is likewise connected to the apparatus G by means of the cord *a'*, *b'*. The instrument is provided on its front face with a control panel 12 on which the operating knobs of the manually operatable switching members and also with a scale window F and a connecting socket MH' for a listening microphone MH.

The mains switch NS can be moved from the "off" to the "on" position, whereby the apparatus is connected to the electrical supply mains.

The selector switch WS can be set, at will, at any one of the three positions 1 ("recording"), 2 ("playback") and 3 ("telephone connection").

The starting switch *St* is for initiating the functions of the instrument in the positions 1 and 2 of the selector switch.

The mechanical construction of the apparatus will now be discussed in reference to Figures 2 to 6.

Figure 2:
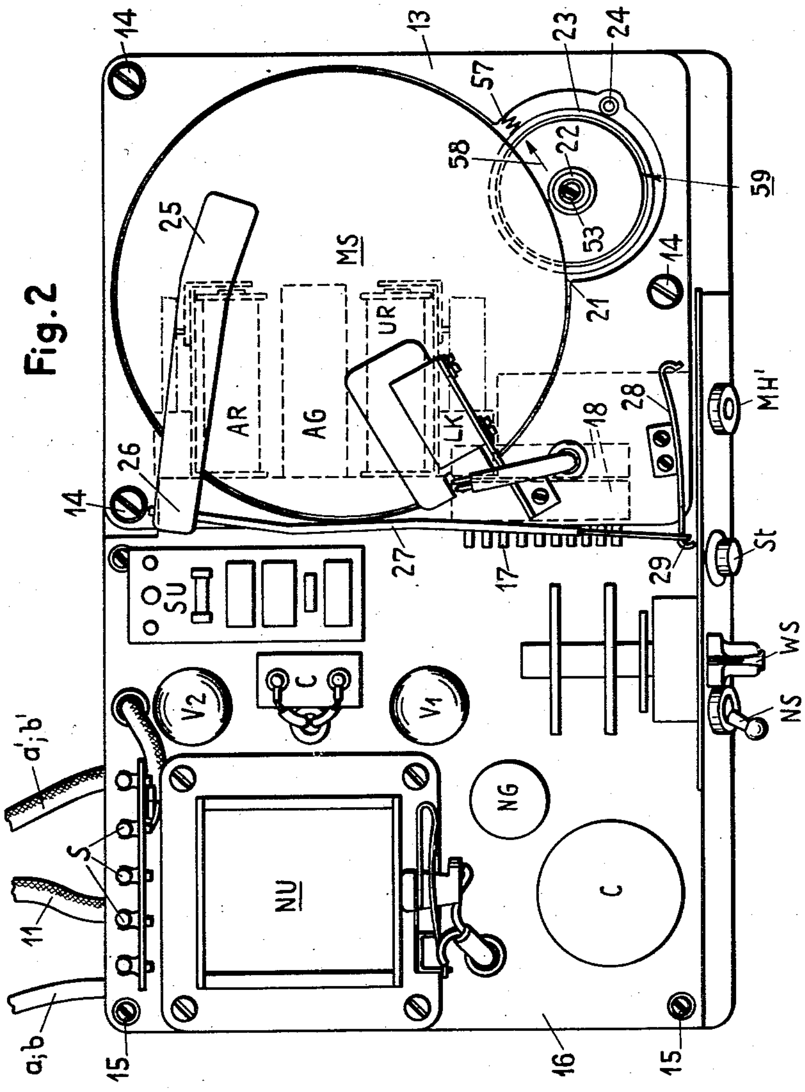
Figure 2 is a plan view from above of the apparatus with the cover removed.
Figure 7:
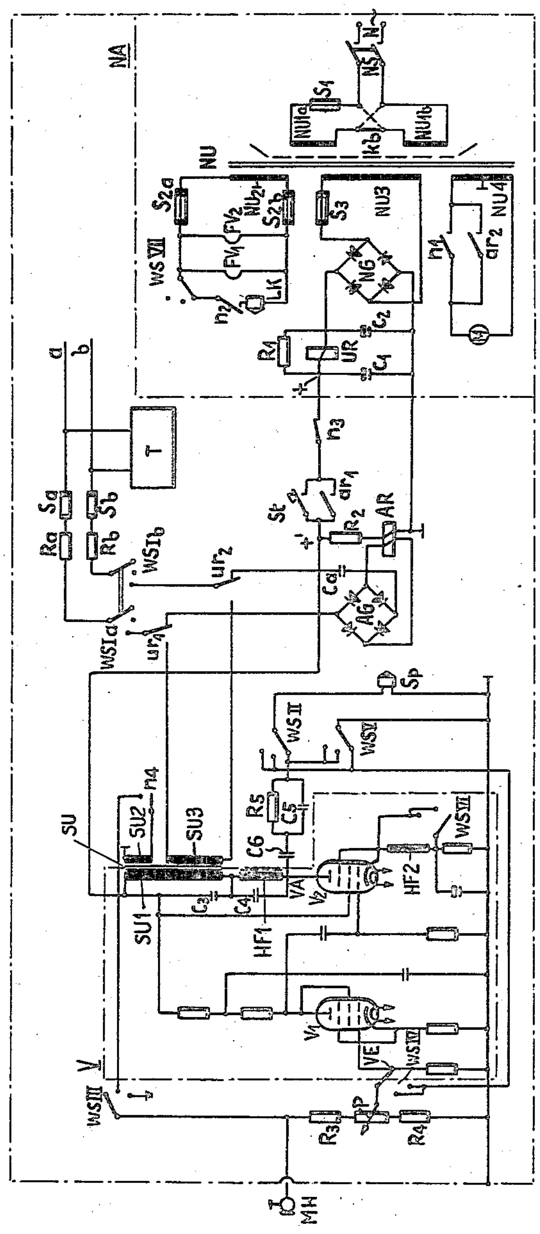
Figure 7 is a general circuit diagram.

An assembly plate 13, visible on the right of Figure 2 and detachable from the supporting frame by unscrewing the screws 14, carries all the moving parts, whilst an amplifier chassis 16, removable by slackening the screws 15, carries the electrical members shown in the circuit diagram of Figure 7 and also the control panel with the control knobs; of the said electrical members, the mains transformer NU, the amplifier tubes $V_1$ and $V_2$, the speech current repeater SU with its appurtenant members, the mains rectifier NG, the two relays AR and UR, the calling rectifier AG, and capacitors C are, for example, visible in Figure 2.

All the electrical connecting leads which are to be taken from the chassis 16 to members on the assembly plate 13, as for example to the motor M, to the recording and playback head *Sp* (Figure 5), to the erasing magnet LK and to the control contact sets N1—N4 (cf. Figure 3) operated by the disk cam, are first taken to a multiple adapter 17 into which a counter plug 18 is inserted, so that the entire chassis 16 can be removed without any connecting lead having to be specially detached.

The sound carrier disk or turn-table MS, which has a magnetizable coating 20 on its upper face, rotates in a recess 21 in the plate 13 through the fact that a rubber-coated disk 22 of a rotary member 59 to which the larger rubber-coated disk 23 which bears against the driven shaft 24 of the motor M also appertains bears against its cylindrical peripheral face. The construction and manner of functioning of this friction gear will be described in greater detail in reference to Figure 6.

The sound recording and playback head *Sp* is secured to the lower face of a supporting arm 25 which swivels on a pivot 26. It is rigidly connected by an arm 27 (Figure 2) to a pointer 29 which moves in the guide 28 and is visible through a window F in the front panel, so that at any given moment the pointer shows, in the said window F, the momentary radial position of the sound head *Sp* on the sound carrier disk MS.

Figures 3, 5:
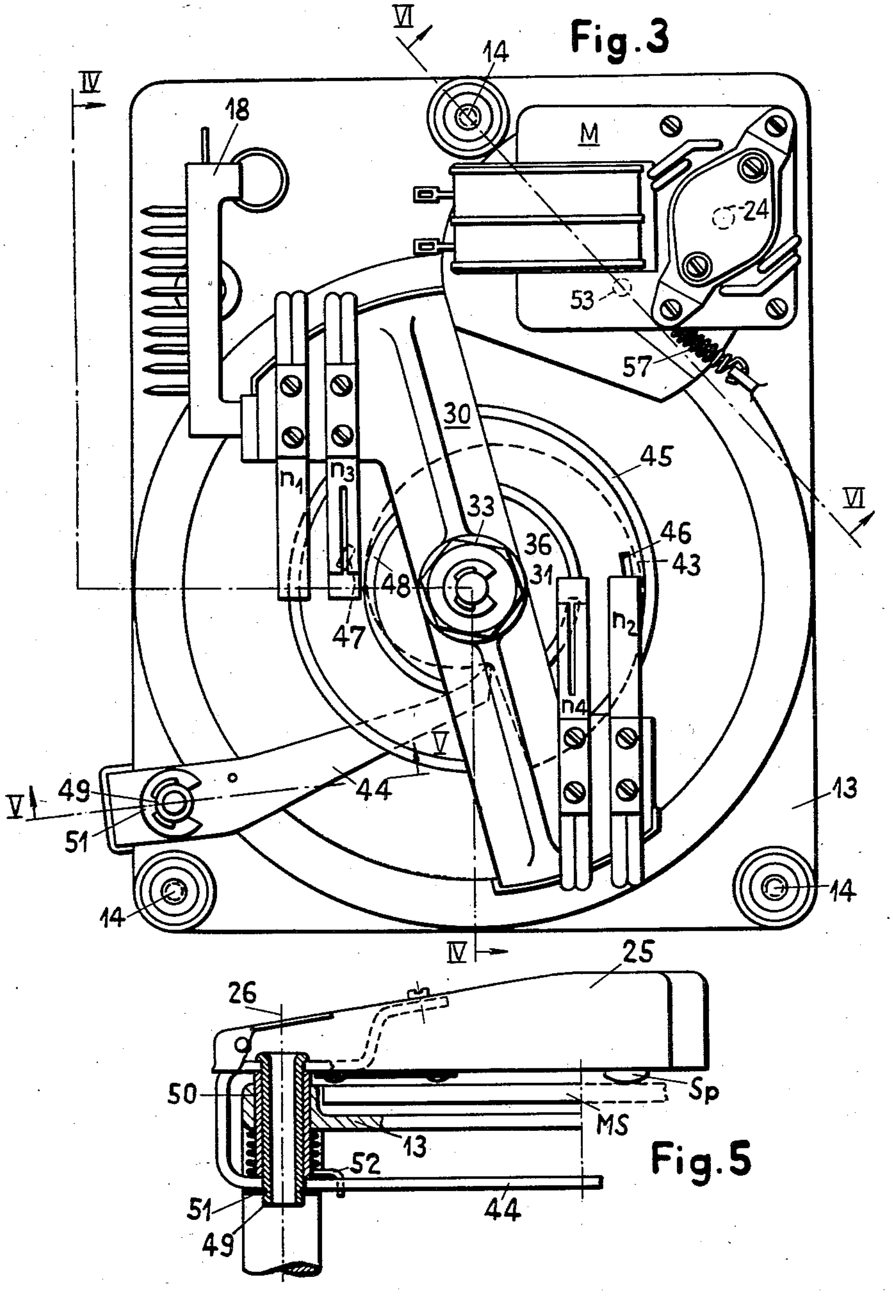
Figure 3 is a plan view from below, shown on enlarged scale, of the assembly plate of the sound carrier disk.
Figure 5 is a section along the line V—V in Figure 3 and shows the mounting of the sound head carrier.
Figures 4, 6:
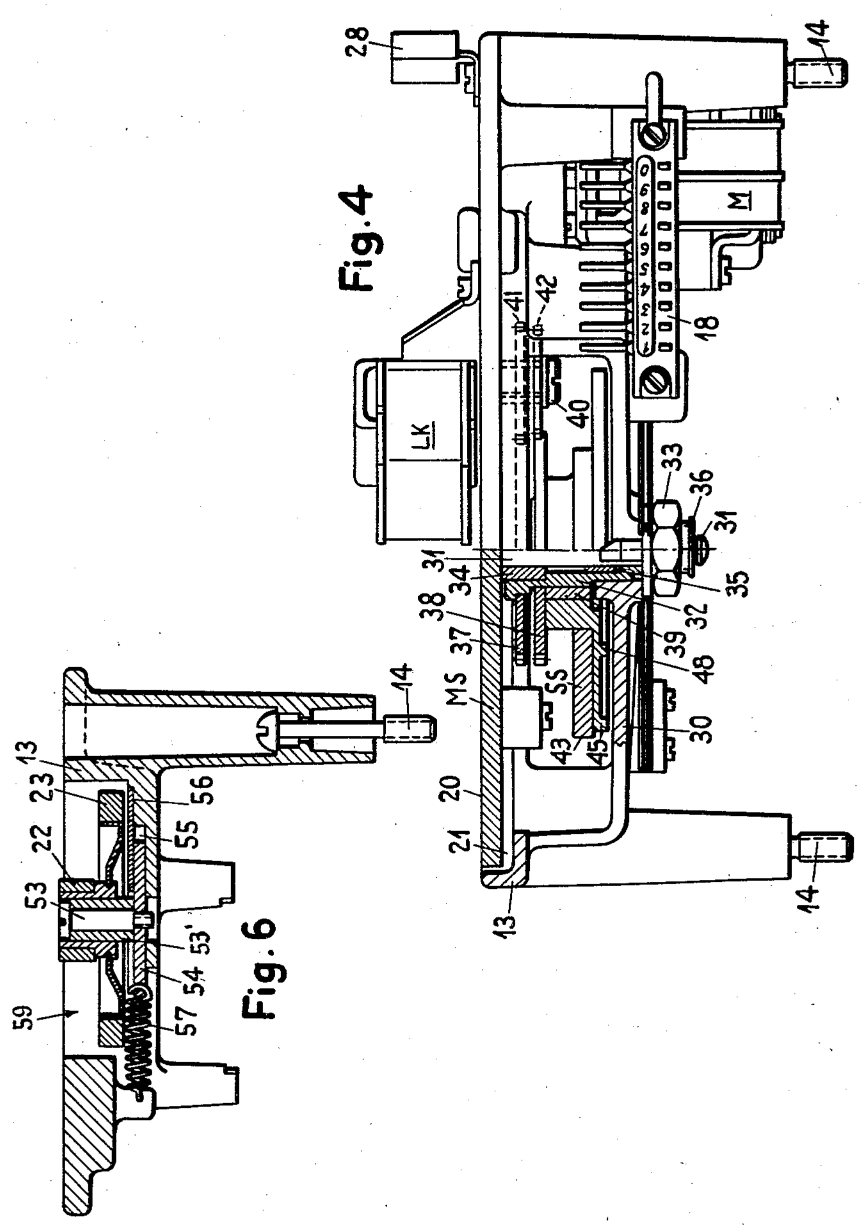
Figure 4 is a section along the line IV—IV in Figure 3, and shows the planetary gear.
Figure 6 is a section along the line VI—VI of Figure 3 and shows the drive of the sound carrier disk.

The lower face of the assembly plate 13 is depicted in Figure 3 and a section along the line IV—IV of the said Figure 3 is shown in Figure 4.

A cross bracket 30 carries the bearing for the sound carrier disk MS, the spindle of which is designated by the reference numeral 31.

A bearing bushing 32 is clamped firmly against the bracket member 30 by a clamping nut 33 and provides two internal bearings for the rotary bearings 34 and 35 rigidly mounted on the shaft 31, whilst a retaining ring 36 on the spindle head 31' prevents axial movement of the spindle 31.

A gearwheel 37 is rigidly secured to the bushing 32 coaxially with the spindle 31, whilst a somewhat larger gearwheel 38 is keyed to a disk cam SS and a bearing bushing 39, so that these three components can rotate in the bushing 32.

On the lower face of the sound carrier disk is mounted a stub shaft 40 on which the two rigidly interconnected planet wheels 41, 42 are rotatably mounted, the first of which said planet wheels rolls in mesh with the stationary gearwheel 37 whilst the second planet wheel positively, and with a considerable reduction ratio, drives the gearwheel 38 and thereby the disk cam SS.

The peripheral face of the disk cam SS is designed as a cam track 43 (cf. Figure 3) against which a detector arm 44 connected to the sound head carrier bears under spring pressure.

Figure 8:
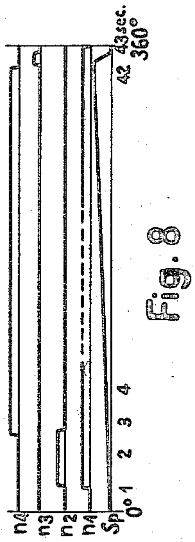
Figure 8 is a diagram showing the chronological relationship between the distinct switching functions.

On the lower face of the disk cam SS are concentric guide ribs 45, 46, 47, 48 of different lengths, which cooperate with sets of contacts *n*1, *n*2, *n*3 and *n*4 in the manner depicted in the diagram of Figure 8.

According to Figure 5, the carrier arm 25 of the sound head *Sp* is rigidly connected to a bushing 49 and the detector arm 44. The bushing 49 is rotatably mounted in a stationary bearing bushing 50 and held by a clamping ring 51 against axial displacement. A spring 52 tends to press the detector arm 44 against the track face 43 of the disk cam SS, so that the sound head *Sp* describes over the disk MS a radial path shown by the curve *Sp* in Figure 8.

Figure 6 shows the mounting of the rotary member 59 with the friction disks 22 and 23.

The entire rotary member is so secured by the screw 53 to a horizontal plate 54 that it can rotate freely on the screw 53. The plate 54 is accommodated in a recess 55 of the assembly plate 13 and is held against vertical movement by a cover plate 56.

A tension spring 57 tends to draw the plate 54, and with it the two disks 22 and 23, in the direction of the arrow 58 (cf. Figure 2) in between the motor shaft 24 and the peripheral face of the sound carrier disk MS.

The disk MS is thus driven by the motor M through a soft friction gear, whilst the disk cam SS is set in rotation by the sound carrier disk through a positive drive planetary gear.

For the purpose of describing the circuit diagram of Figure 7, a few general features will first be discussed.

The mains connection unit NA contains primarily the mains transformer NU with the primary windings NU1*a* and NU1*b*, the heating winding NU2, the anode voltage winding NU3, and the motor winding NU4.

Associated with the anode winding NU4 are a dry rectifier bridge NG and a filtering circuit, the latter consisting of the winding of the switching relay UR, the resistor R1 connected in parallel therewith, and the two smoothing capacitors C1 and C2.

The heating winding NU2 mainly serves the purpose of heating the filaments FV1 and FV2 of the amplifier tubes.

The primary power circuit contains the two-pole hand switch NS the switching on of which results in the alternating current supply N-flowing by the following circuit to the primary windings of the mains transformer NU:

(1) Mains N—mains switch NS—fuse S1—winding NU1*a*—contact bridge *kb*—winding NU1*b*—mains switch NS—mains N.

In the case of power networks of half the standard voltage, the contact bridge *kb* can be brought into the position shown in a discontinuous line, so that the primary windings of the mains transformer are connected in parallel.

Further fuses in the mains connection unit are designated by S2*a*, *b* (heating current fuses) and S3 (anode current fuse).

The amplifier V contains the two valves V1 and V2 and delivers at terminal VA (anode of final tube V2) an amplified audio-frequency voltage which is proportional to the voltage supplied to the input terminal VE (grid of amplifier tube V1).

In the anode circuit of the end tube V2 the winding HF1 of a high-frequency transformer is arranged, which are (is) bridged by the capacitors C4 and C3.

The second winding HF2 of the HF transformer is connected to the cathode of the end tube V2. If it is not bridged, it acts as a reaction coil and in consequence a high-frequency superposed voltage is excited in the end tube V2, the frequency of which voltage is determined by the oscillating circuit HF1—C4 and is superposed on the amplified audio-frequency voltage.

The wiper arms of the selector switch WS are designated by the reference symbols WSI*a*, WSI*b*, WSII, WSIII, etc., and are shown in position 1 ("recording").

The control contacts, shown in their positions of rest, and which are actuated by the disk cam, are designated *n*1, *n*2, *n*3 and *n*4.

The chronology of their actuation is shown in the graph of Figure 8, which, in the direction of the axis of abscissa, comprises one complete revolution of the disk cam and indicates the relevant angular positions and times. Figure 8 also shows, in the curve *Sp*, the radial movements of the sound head *Sp* on the sound carrier disk.

The following is the manner in which the apparatus described and illustrated functions:

(*A*) *Position 1 ("Recording")*

When primary power circuit (1) has been completed by switching on the mains switch NS, the apparatus is ready for operation, since the filaments FV1 and FV2 of the amplifier tubes are heated by the winding NU2 via the following circuit:

(2) Mains transformer winding NU2—fuse S2*a*—filaments FV1 and FV2—fuse S2*b*—winding NU2.

Between the positive terminal + of the aforementioned filtering circuit and earth is the anode direct-current voltage generated in the rectifier NG.

The transformer winding NU4 for the motor is under tension, but the motor M is still at rest.

By brief pressure on the starting switch *St*, the following circuit for energizing the holding winding of the calling relay AR and for energizing the anode circuits of the amplifier tubes is closed:

(3) Anode voltage terminal +—control contact *n*3—starting switch *St*—terminal +′ resistor R2—holding winding of calling relay AR—earth.

Between the said terminal +′ and earth are also the anode circuits of the amplifier V, so that the amplifier tubes are placed under tension.

The result of the excitation of the calling relay AR is that circuit (3) is held by its contact *ar*1, which, when the starting switch *St* is released, assumes the latter's function in circuit (3).

When circuit (3) is closed, switching relay UR is also excited, but this has no effect.

Through the excitation of the calling relay AR, the following exciter circuit for the motor M is also closed:

(4) Mains transformer winding NU4—AR relay contact *ar*2—motor M—winding NU4.

The motor M thus begins to turn, and sound carrier disk MS is also set in motion, said disk MS positively driving the disk cam SS at reduced speed through the planetary gear already described. After the lapse of approximately one second, control contact *n*1 is operated by disk cam SS, as shown in Figure 8, said control contact then remaining closed until the disk cam has performed a complete revolution.

It bridges the AR relay contact *ar*2 in the motor energization circuit (4), so that said circuit is not broken again until the end of the operating cycle. By these means it is assured that at every actuation the disk cam will perform a complete revolution.

The erasing magnet LK is energized by a circuit as follows:

(5) Heating winding NU2—fuse S2*a*—selector switch wiper WSVII—control contact *n*2—erasing magnet LK—fuse S2*b*—winding NU2.

The erasing magnet spans the entire recording width of the sound carrier disk and is permanently in position, so that as the sound carrier disk revolves all magnetograms recorded are automatically erased. When the sound carrier disk has revolved once, i. e., in about the third second, control contact $n2$ opens again, as shown in Figure 8, and then remains continuously open. Circuit (5) is thus cut out again.

Instead, however, the control contact $n4$, designed as a rest contact, is simultaneously actuated, i. e., opened, though in this functional (recording) position of the selector switch the opening of said rest contact has no effect.

At this stage the user observes the pointer 29 to enter the scale window F (Figure 1) from the left, and he can now dictate his message into the microphone MH, e. g.:

"This is Miller and Company, Zürich. Our offices and works are closed all day on Monday August twentieth. Urgent messages can be telephoned to 42 00 40."

The corresponding speech alternating currents pass over the following microphone circuit:

(6) Earth—microphone MH—resistor R3—voltage conductor P—resistor R4—earth.

A fraction of this voltage is fed to the amplifier input terminal VE through selector switch wiper arm WSIV.

This partial voltage is amplified in the amplifier $V_1$ and therefore appears at terminal VA, a high-frequency voltage excited by the action of the HF coils HF1 and HF2 in the end tube V2 being superposed thereupon.

From the output terminal VA, the following circuit leads through the sound head *Sp*:

(7) Terminal VA—capacitor C6—RC-circuit-R5—C5 selector switch WSII—sound recording head *Sp*—earth.

Through the selector switch WSV the fixed contact terminals 2 and 3 of the selector switch wiper arms WSII and WSIV are earthed.

In this way the audio-frequency currents with the superposed HF voltage are recorded in a spiral sound track on the sound carrier disk MS, the sound head *Sp* being guided radially across the revolving sound carrier disk MS as shown in Figure 8.

In this process, the user is at all times shown by the pointer 29 the amount of speaking time, which may be about forty seconds, still available to him.

On the expiration of the speaking time, i. e. at about the forty-third second of the operating cycle, the control contact $n3$ is, as shown in Figure 8, briefly opened by the disk cam SS.

As a result, circuit (3) for energizing the holding winding of the calling relay AR and for energizing the anodes of the tubes is broken, and because this causes the relay AR to drop, the said circuit (3) remains permanently open. The anode circuits of the amplifier V accordingly become de-energized.

The exciter circuit (4) for the motor M still remains closed, as stated, until at the end of the cycle the control contact $n1$ is opened. Then the motor M stops, i. e., after each operating cycle the various switch members are back in their respective positions of readiness as depicted in the drawing.

(*B*) *Position 2 ("Playback")*

To enable the user to verify the correct recording of the dictated message, he turns selector switch WS to position 2 and again briefly operates the starter key *St.* Circuits (3) and (4) are thereby consecutively closed.

Circuit (5) for energizing the erasing magnet is not established because the terminal 2 of the selector switch wiper arm WSVII is not connected to the control contact $n2$.

The connection to the microphone circuit (6) and the circuit (7) from the amplifier output terminal VA to the sound head *Sp* are likewise not established. The sound head *Sp* is connected through the following circuit to the amplifier input side:

(8) Earth—sound head *Sp*—selector switch wiper arm WSII—selector switch wiper arm WSIV amplifier input VE.

The HF feedback winding HF2 is bridged by the selector switch wiper arm WSVI, so that the high frequency superposed voltage is not excited.

Since at the end of the third second the control contact $n4$ has been opened, the following output circuit of the speaking current transformer SU has been made operative:

(9) Earth—output winding SU2—selector switch wiper arm SWIII—listening microphone MH—earth,

(*C*) *Position 3 ("Telephone connection")*

In position 3 of the selector switch WS the apparatus is connected to the subscriber line *a*, *b* of the telephone network, i. e., the subscriber set T is shunt connected.

When this subscriber set is called, the calling current pulse proceeds along the following circuits:

(10) Subscriber line wire *a*—fuse S*a*—resistor R*a*—selector switch wiper arm WSI*a*—UR relay contact $ur_1$—calling rectifier AG—direct current blocking capacitor C*a*—UR relay contact $ur_2$—selector switch wiper arm WSII*b*—resistor R*b*—fuse S*b*—subscriber line wire *b*.

Such a calling A. C. impulse is rectified in the rectifier AG and excites the calling relay AR through the following circuit:

(11) Calling rectifier AG—relay winding I of calling relay AR—calling rectifier.

As a result, the circuits (3) and (4) are consecutively closed, i. e., amplifier V is placed under tension and motor M begins to turn.

The switching relay UR excited by the anode current throws over its changeover contacts $ur1$ and $ur2$, so that circuit 10 is cut out again and replaced by the following speaking circuit permeable to direct current:

(12) Subscriber line wire *a*—fuse S*a*—resistor R*a*—selector switch wiper arm WSI*a*—UR relay contact $ur1$—speaking current transformer winding SU3—UR relay contact $ur2$—selector switch wiper arm WSI*b*—resistor R*b*—fuse S*b*—subscriber line wire *b*.

The call is thereby answered.

Because the sound head *Sp* is connected via circuit (8) to the amplifier input side VE, the message recorded on disk MS is transmitted to the caller through circuit (8)—amplifier V and circuit (12).

Circuit (9) from the speech current transformer winding SU2 through the microphone MH has also been closed, but is of no practical effect. The HF reaction coil HF2 is bridged.

At the end of the operating cycle, control contact $n3$ opens the calling relay holding and anode energizing circuit (3), thereby cutting off the calling subscriber (relay UR released).

Control contact $n1$ then also breaks the motor feed circuit (4), leaving the apparatus in a condition of readiness for answering a further call in the same manner.

What I claim is:

1. Apparatus of the character described comprising a frame, a disk revolvably mounted on said frame and revolvable about an axis and adapted to support a sound carrier medium, drive mechanism adapted to revolve said disk, a pivot on said frame displaced from said axis, an arm swingable about said pivot, sound recording and reproducing head means on said arm and spaced from said pivot, said arm being adapted to swing about said pivot with said head means moving generally across said disk, a first gear fixed on said frame concentric with said axis, a second gear revolvably mounted on said frame concentric with said axis, a planetary gear mechanism engaging both said first and second gears and rotatably mounted on said disk eccentric of said axis, a guide movably mounted on the frame and coupled to said second gear and adapted to be driven thereby, and a detector element coupled to said arm and engaging said guide for swinging said arm.

2. Apparatus of the character described as claimed in claim 1 and wherein said guide is rotatably mounted on the frame concentric with said axis.

3. Apparatus of the character described as claimed in claim 2 and wherein said guide defines a generally spiral track and said detector element engages said track.

4. Apparatus as claimed in claim 3 and wherein said detector element is a second arm coupled to said swingable arm and swingable about said pivot, said first and second gears and said planetary gear means providing a considerable speed reduction ratio, whereby said disk revolves a plurality of times for each rotation of said guide.

5. Apparatus of the character described comprising a frame, a spindle mounted on said frame and revolvable about an axis, drive mechanism for revolving said spindle, a first rotatable sound transducing element drive member coupled to said spindle in positive drive relationship therewith, said first member being adapted to drive a first sound transducing element, a first gear fixed on said frame concentric about said axis, a second gear rotatably mounted on said frame concentric with said axis, a revolvable shaft mounted on said frame and being displaced from and revolvable about said axis, said shaft being coupled to said spindle in positive drive relationship therewith, whereby the revolution of said shaft about said axis is positively related to the rotation of said carrier drive member, a planetary gear mechanism rotatably mounted on said shaft and engaging both said first and second gears, a guide revolvably mounted on said frame and coupled to said second gear in positive drive relationship therewith, a second rotatable sound transducing element drive member coupled to said guide in positive drive relationship therewith, said second member being adapted to drive a second sound transducing element, thereby to move said transducing elements in scanning relationship therewith.

6. Apparatus of the character described as claimed in claim 5 and wherein said planetary gear mechanism includes a first planetary gear engaging said first fixed gear and a second planetary gear interconnected with said first planetary gear and engaging said second rotatable gear.

7. Apparatus of the character described as claimed in claim 5 and wherein said first rotatable member is a turntable and said second rotatable member is an arm swingable across said turntable in scanning relationship with a sound carrier element driven by said turntable.

8. Apparatus of the character described as claimed in claim 5 and wherein said drive mechanism includes an electric circuit and a switch for changing the energization of said circuit, and a switch actuating element on said guide arranged to actuate said switch.

9. Apparatus of the character described as claimed in claim 5 and wherein said apparatus includes an amplifier, an input circuit adapted to be connected to a source of speech currents, a switch for completing said input circuit to said amplifier, said guide including an element arranged to engage said switch for completing said input circuit.

10. Apparatus of the character described as claimed in claim 9 in conjunction with a telephone subscriber set and a telephone line, said input circuit being coupled to said telephone line, and wherein said switch is arranged to connect said input circuit to said amplifier.

11. Apparatus of the character described as claimed in claim 10 and including a source of energizing current for the amplifier, a circuit between said source and said amplifier including a relay, said switch being in said circuit, and a second switch between said telephone line and said input circuit, said second switch being actuated by said switch.

12. Apparatus of the character described comprising a frame, a turntable revolvably mounted on said frame and revolvable about an axis and adapted to support a sound carrier medium, drive mechanism including a friction wheel engaging said turntable to revolve said turntable, a pivot on said frame, an arm swingable about said pivot, sound recording and reproducing head means on said arm spaced from said pivot, said arm being adapted to swing about said pivot with said head means moving generally across at least a portion of said turntable, a first gear fixed on said frame concentric with said turntable axis, a second gear revolvably mounted on said frame concentric with said turntable axis, a planetary gear mechanism engaging both said first and second gears and rotatably mounted on said turntable eccentric of said turntable axis, a guide movably mounted on the frame and coupled to said second gear and adapted to be driven thereby, and a detector element coupled to said arm and engaging said guide for swinging said arm across the turntable as said drive mechanism revolves said turntable.

13. Apparatus of the character described as claimed in claim 12 and wherein said guide includes a spiral cam revolvable about said axis and said detector element engages said spiral cam, said first and second gears and said planetary gear mechanism provide a substantial speed reduction, whereby said turntable revolves a plurality of times as said guide revolves once.

14. Apparatus of the character described as claimed in claim 12 and wherein said drive mechanism includes a driven shaft, two rotary friction drive disks interconnected, a movable plate supporting said disks, a spring connected between said plate and the frame and urging said plate to engage one of said disks with said shaft and the other with the turntable periphery.

15. Apparatus of the character described as claimed in claim 12 and including a pointer coupled to said arm, a scale window in said frame, said pointer indicating in said window the relative position of said head means and turntable.

16. Apparatus of the character described as claimed in claim 12 and wherein said turntable is adapted to support a magnetic sound recording and reproducing medium, an erasing magnet fixed to the frame near said turntable and spanning the entire width of the medium, a circuit for energizing said magnet, a switch in said circuit, a switch actuating element on said guide and arranged to actuate said switch.

17. Apparatus of the character described as claimed in claim 13 and wherein said guide is a disk that rotates concentric with said turntable axis, said guide disk including a spiral track engaged by said detector for swinging said arm and a plurality of concentric guiding elements on one face of said guide disk, a plurality of switches near said guide disk and arranged to be actuated in predetermined sequence by said elements.

References Cited in the file of this patent

UNITED STATES PATENTS

| | | |
|---|---|---|
| 2,080,812 | Fairbanks | May 18, 1937 |
| 2,539,139 | Jordanoff et al. | Jan. 23, 1951 |
| 2,549,548 | Von Zimmermann | Apr. 17, 1951 |
| 2,673,242 | Van Deventer | Mar. 23, 1954 |